Aug. 15, 1950   W. M. PEASE   2,518,568
WEIGHING SCALE INDICATING MECHANISM
Filed Dec. 8, 1947   4 Sheets-Sheet 1
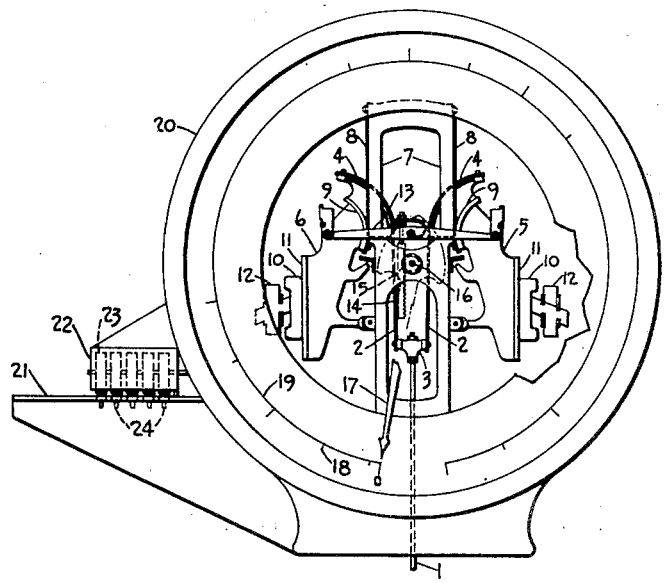
Fig. I
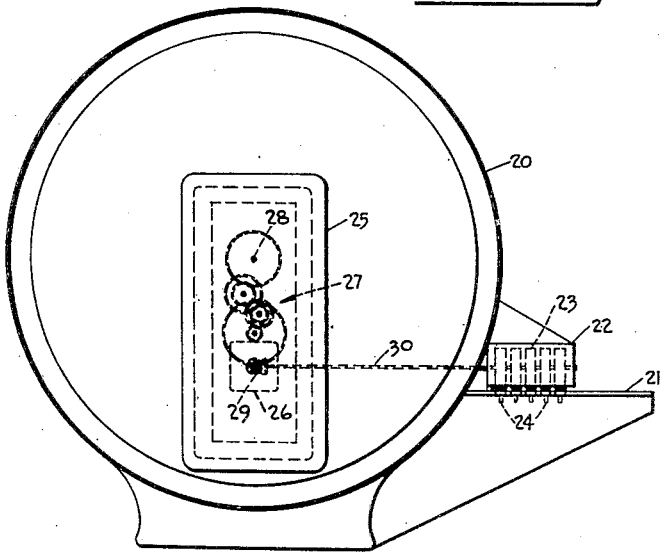
Fig. II
INVENTOR.
William M. Pease
BY
Marshall and Marshall
ATTORNEYS Aug. 15, 1950        W. M. PEASE        2,518,568
WEIGHING SCALE INDICATING MECHANISM
Filed Dec. 8, 1947        4 Sheets-Sheet 2
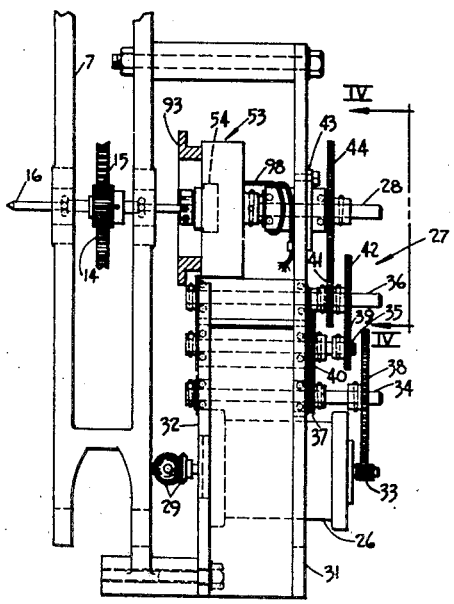
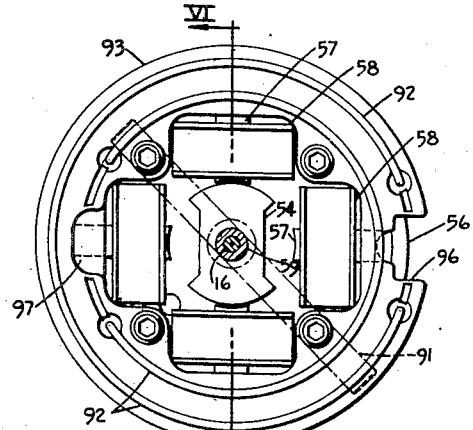
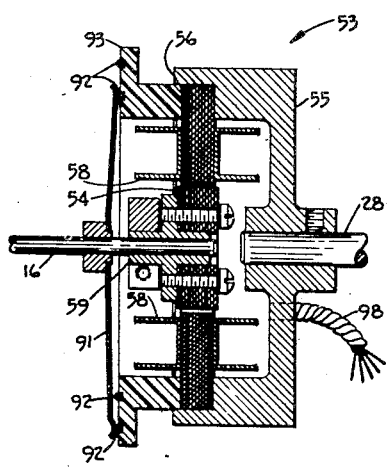
*INVENTOR.*
William M. Pease
BY
Marshall and Marshall
ATTORNEYS

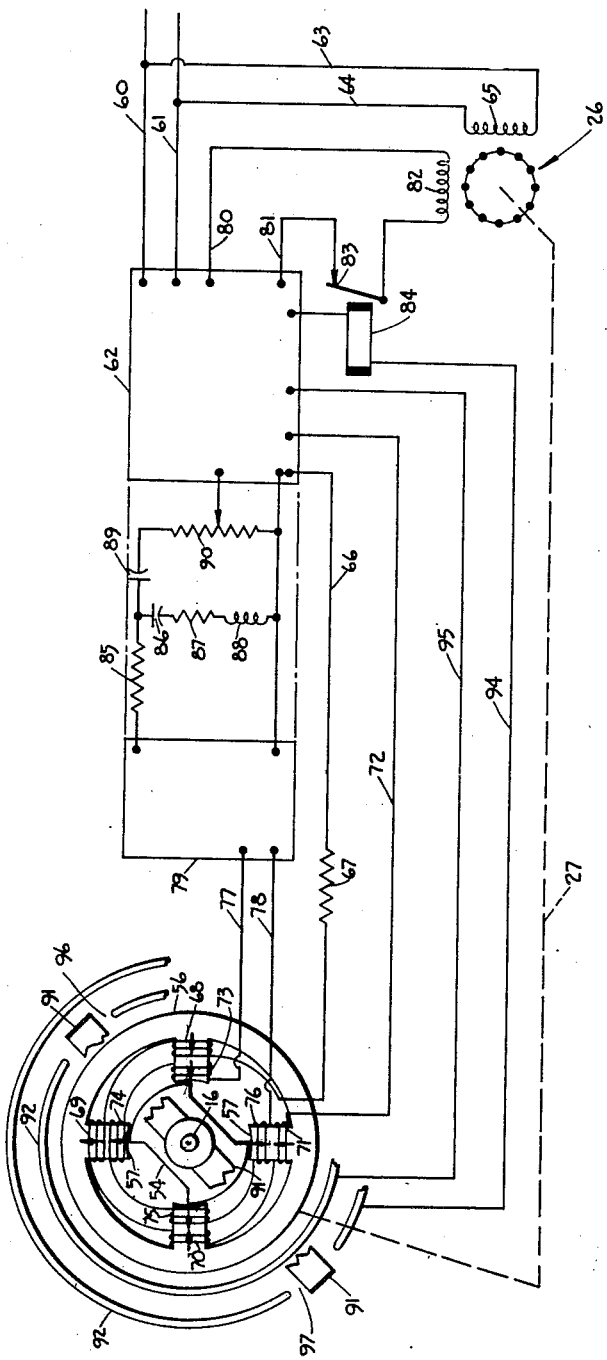
Fig. VII
INVENTOR.
William M. Pease
BY
Marshall and Marshall
ATTORNEYS Aug. 15, 1950  W. M. PEASE  2,518,568
WEIGHING SCALE INDICATING MECHANISM
Filed Dec. 8, 1947  4 Sheets-Sheet 4
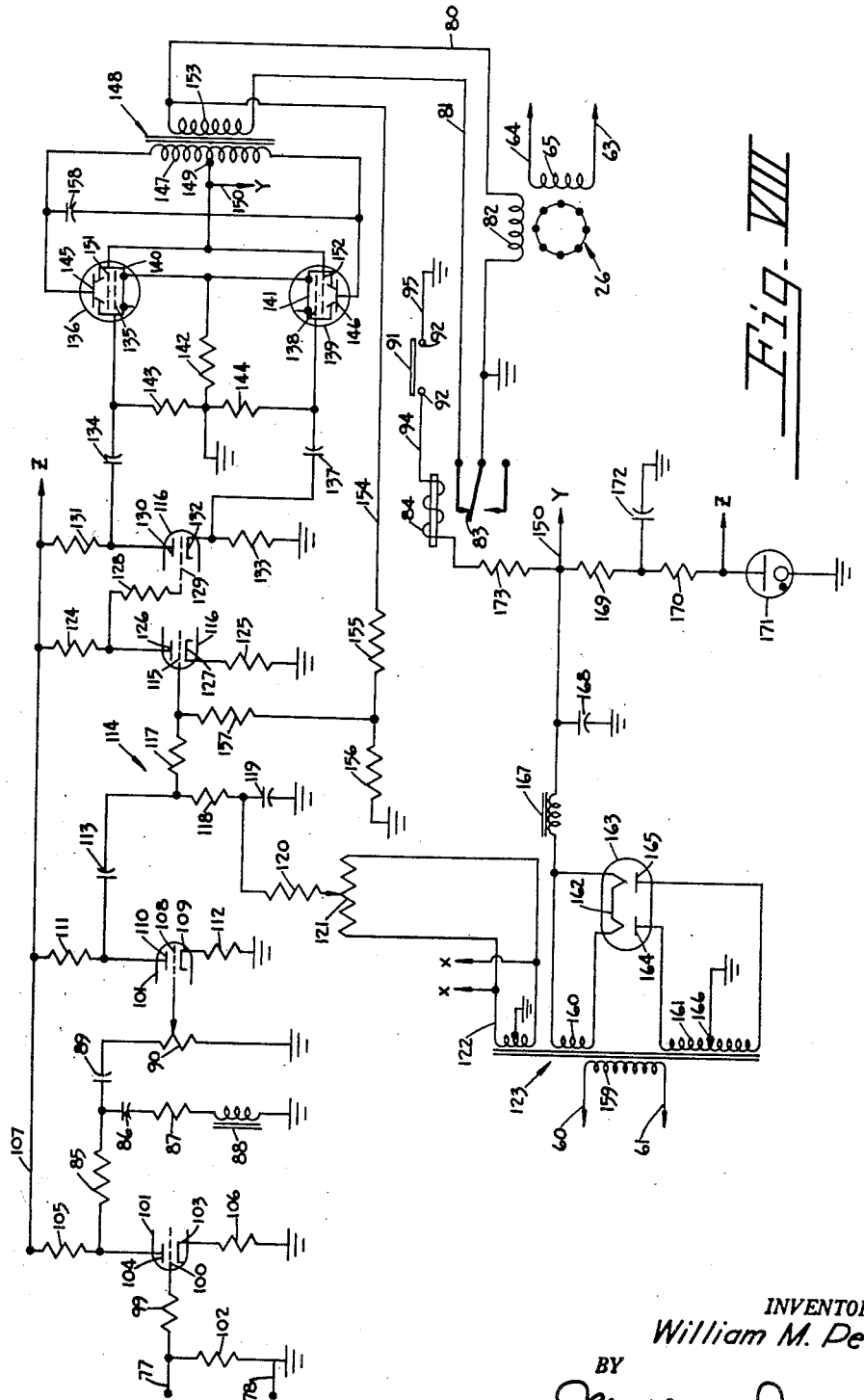
Fig. VIII
INVENTOR.
William M. Pease
BY
Marshall and Marshall
ATTORNEYS Patented Aug. 15, 1950

2,518,568

UNITED STATES PATENT OFFICE 2,518,568

WEIGHING SCALE INDICATING MECHANISM

William M. Pease, Boston, Mass., assignor to Toledo Scale Company, Toledo, Ohio, a corporation of New Jersey Application December 8, 1947, Serial No. 790,248

6 Claims. (Cl. 318—31)

This invention relates to weighing scales and more particularly to apparatus for increasing the torque available for positioning load indicating mechanism.

In an ordinary automatic weighing scale forces from the load being weighed are counterbalanced by either a pendulum or a spring and the magnitude of the load is indicated by a pointer or dial mechanism actuated by the movement of the pendulum or the extension of the spring. In a perfect automatic weighing scale a fraction of the weight of the load, precisely determined by the lever ratio of the scale, is applied to the counterbalancing element and all of that fraction is counterbalanced by the counterbalancing element. The number of different types of indicating mechanisms that may be used is very seriously limited because any physical indicating mechanism that is driven by the movement of the pendulum or the extension of the spring upsets the equilibrium between the load and the counterbalancing elements to an extent depending upon the force required to drive that mechanism. In these weighing scales the only force available for driving the indicating mechanism is the difference between the force from the weight of the load and the force of the counterbalancing mechanism. If the load is exactly balanced by the counterbalancing element, there is no force whatsoever available for driving the indicating mechanism. Conversely, if there is force applied to drive the indicating mechanism the counterbalancing mechanism has not reached its true load counterbalancing position and the indicating mechanism therefore fails to indicate the exact load being weighed.

The inability of an automatic weighing scale to supply an appreciable force to an indicating mechanism when it is exactly counterbalancing a load has seriously hindered the usefulness of weighing scales. For example, it is impossible to drive a counter directly from a weighing scale, it is impossible to proportionally control an industrial process according to the weight on the scale and even the simplest of indicators must be very accurately constructed to keep the friction within a tolerable amount.

The principal object of this invention is to overcome these limitations of ordinary automatic weighing scales by employing a motor to drive the indicating or controlled mechanism to a position that accurately corresponds to the position of the load counterbalancing pendulum or the extension of a load counterbalancing spring.

Another object of the invention is to provide a position detecting mechanism that, over the normal range of operation, does not affect the position of the load counterbalancing mechanism.

Another object of the invention is to provide a motor-driven indicating mechanism that is maintained in exact registry with the load counterbalancing mechanism whether the load counterbalancing mechanism is at rest or is moving at a constant velocity.

A still further object of the invention is to provide a simple, reliable, stable circuit for energizing the motor that drives the indicating mechanism.

More specific objects and advantages are apparent from the following description in which reference is made to the accompanying drawings.

The invention consists in providing mechanism that may be interposed between a movable portion of an automatic weighing scale and an indicating mechanism for moving the indicating mechanism in exact accordance with the motion of the weighing scale member without imposing any restraint on the motion of the weighing scale member. This is accomplished by arranging a portion of the indicating mechanism to move along a path parallel to the path of a portion of the load counterbalancing mechanism and equipping said portions with signal generating means for indicating the relative displacements of said portions with respect to each other. The signal from the generating means, after amplification and suitable modification, is employed to energize an electrical motor for driving the indicating mechanism. The modification of the signal from the generating means, which signal is proportional to the relative displacement of the cooperating portions of the indicating mechanism and the load counterbalancing mechanism, is accomplished by a circuit included in the amplifier and is such that the signal applied to the motor has a first component that is proportional to the relative displacement of said portions and a second component that is approximately proportional to the rate of change of the displacement of said portions. This modification of the signal within the amplifier preferably is accomplished by a series resonant circuit and the component resulting from the modification—the component that is proportional to the rate of change of displacement—provides sufficient anticipation of the approach to synchronism between the cooperating portions of the signal generating means to prevent the indicating mechanism from oscillating or hunting about the position of synchronism.

The accompanying drawings illustrate a preferred form of the invention.

In the drawings:

Figure I is a front elevation of the load counterbalancing mechanism of a weighing scale incorporating the invention.

Figure II is a rear elevation of the housing enclosing the load counterbalancing mechanism to show the drive to a counter that is employed as part of the load indicating mechanism.

Figure III is a side elevation showing part of the motor-driven mechanism and its cooperation with a portion of the load counterbalancing mechanism of the weighing scale.

Figure IV is a fragmentary elevation as seen from the line IV—IV of Figure III.

Figure V is an elevation, partly in section, of the signal generating means a portion of which is carried on the load counterbalancing mechanism and a portion of which is carried on the motor-driven indicating mechanism.

Figure VI is a section taken through the signal generating means substantially along the line VI—VI of Figure V.

Figure VII is a schematic diagram showing the cooperation of the signal generating means, the amplifier and the motor.

Figure VIII is a schematic wiring diagram of the amplifier.

These specific figures and the accompanying description are intended merely to illustrate the invention but not to impose limitations on the claims.

The improved apparatus may be used wherever it is desired to position an auxiliary mechanism according to the load on a weighing scale. The auxiliary mechanism may consist of an indicating counter, it may consist of elements that control an industrial process or, in fact, any indicating or control apparatus of similar character. For purposes of illustration only, the improved apparatus of the invention is shown arranged to drive a counter to indicate and set up type wheels according to the load on the weighing scale. The auxiliary driven mechanism, such as the counter or other structure, may be arranged in any physical relationship to the load counterbalancing mechanism as long as a mechanical drive from the motor to the mechanism may be employed.

Referring now to Figure I of the drawings, forces from loads being weighed are transmitted through a lever system (not shown) to a steelyard rod 1 that by means of power ribbons 2 and a yoke 3 is suspended from power sectors 4 of a pair of load counterbalancing pendulums 5 and 6. The pendulums 5 and 6 are suspended at the sides of a sector guide 7 by means of fulcrum ribbons 8 that overlie and are attached to fulcrum sectors 9 of the pendulums 5 and 6. The relationship between the power sectors 4 and the fulcrum sectors 9 is such that with an increase of load applied to the steelyard rod 1 the pendulum bodies 5 and 6 swing outwardly and upwardly as the fulcrum sectors 9 roll upwardly along the sides of the sector guides 7.

The movement of the pendulums 5 and 6 in response to a given increment of load applied to the steelyard rod 1 is determined by the position of weights 10 along rails 11 of the pendulum bodies 5 and 6. Secondary weights 12 that are movable transversely of the rails 11 provide adjustment of the half-capacity indication of the weighing scale.

The upward movement of the pendulum bodies 5 and 6 in response to an increment of load is transmitted through compensating bars 13 to a rack 14 that meshes with a pinion 15 mounted on a pointer shaft 16 carrying a pointer 17. The pointer 17 cooperates with indicia 18 of an annular chart 19 to indicate the magnitude of the load being counterbalanced. The relationship between the various parts of the pendulum counterbalancing mechanism is such that the pointer 17 is rotated through equal angles for equal increments of load. This linear relationship must be maintained whenever it is desired to use a multi-revolution indicating mechanism in which the increments of load per revolution of the indicating mechanism must remain constant throughout the weighing capacity of the scale.

The load counterbalancing mechanism including the pendulums 5 and 6 is contained within a substantially watchcase shaped housing 20. A table 21 extending from one side of the lower portion of the housing 20 is adapted to support sheets of paper upon which load indications are to be printed. A counter 22 equipped with type wheels 23 is mounted immediately above the table 21 and is slightly separated from the table so that the sheets of paper may be inserted therebetween. A plurality of hammers 24, indicated as being mounted within the table 21, are aligned with the type wheels 23 so that when the hammers are actuated, by a suitable mechanism which may be included in the understructure of the table 21, the weight indications will be printed on the paper.

The counter 22 is merely an example of mechanism which according to the invention may be driven according to the movement or position of a portion of a load counterbalancing mechanism.

Figure II is a rear elevation of the watchcase-shaped housing 20 and shows a small auxiliary housing 25 attached to the rear cover of the housing 20 and adapted to enclose a driving motor 26 and a gear train 27 having a low speed shaft 28 that is axially aligned with the pointed shaft 16 of the load counterbalancing mechanism. The motor 26, by means of a pair of beveled gears 29, also drives a shaft 30 leading to the counter 22.

The gear train 27 is shown in side elevation in Figure III. A frame consisting of a back plate 31 and a shorter front plate 32 is mounted from the back side of the sector guide 7. The back plate 31 extends from the bottom of the sector guide 7 to a point above the pointer shaft 16 while the front plate 32 is cut off at a considerable distance below the pointer shaft 16. The motor 26 is mounted from the front plate 32 near the bottom of the frame and extends through an opening in the back plate 31. The end of the armature shaft of the motor projecting through the front plate 32 carries one of the bevel gears 29 while the other end of the armature shaft carries a pinion 33 constituting the high speed end of the gear train 27.

The gear train 27 includes three intermediate shafts 34, 35 and 36 each of which carries a large and a small gear. The first of the intermediate shafts, the shaft 34, carries a small gear 37 and a large gear 38 that meshes with and is driven by the motor pinion 33. The second intermediate shaft, the shaft 35, carries a small gear 39 and a larger gear 40 that meshes with and is driven by the small gear 37 of the first intermediate shaft 34. The third of the intermediate shafts, the shaft 36, carries a small gear 41 and a larger gear 42 that meshes with and is driven by the small gear 39 of the second intermediate shaft 35. The output shaft 28, which is held in axial alignment with the pointer shaft 16 by bearings contained in a bracket 43 attached to the rear mounting plate 31, carries a gear 44 that meshes with and is driven by the smaller gear 41 of the third intermediate shaft 36. The gears of the gear train 27 provide a speed reduction and corresponding torque multiplication of approximately 150 to 1.

Referring now to Figure IV, the gear 44 carried on the output shaft 28 is provided with a laterally directed pin 45 that strikes a bar 46 pivotally mounted on a screw 47 and drives the bar against one or the other of a pair of resilient stops 48. Each of the stops 48 consists of a housing 49 having a cylindrical bore in which a protruding slidable piston-like button 50 is urged outwardly against a snap ring 51 at the mouth of the bore by a relatively stiff helical spring 52 contained within the bore. This arrangement provides resilient stops confining the travel of the output shaft 28 to slightly more than one complete revolution. The resiliency of the stops prevents damage to the gear train 27 and also contributes to the control of the motor when the indicating mechanism is not in synchronism with the movable portion of the load counterbalancing mechanism.

Referring again to Figure III, the output shaft 28, which is axially aligned with the pointer shaft 16, carries a first portion constituting a stator 53 of a signal generator that generates a signal proportional to the rotational misalignment of the output shaft 28 and the pointer shaft 16. The stator 53 of the signal generator, even though it rotates with the output shaft 28, is referred to as a stator because, of the elements of the signal generator, it most nearly resembles the stationary part of an ordinary electrical motor or generator. The stator 53 cooperates with a rotor or armature 54 that is mounted on the end of and that rotates with the pointer shaft 16. The stator 53 constitutes a second member that is driven along a path parallel to the path of movement of a first member (exemplified by the armature 54) operatively connected to load counterbalancing mechanism. Whether the parallel paths be arcuate or rectilinear affects only the physical design but not the cooperation of the members.

The mechanical construction of the signal generator including the stator 53 and armature 54 is indicated in Figures V and VI. The stator 53 includes a non-magnetic cup-shaped support 55 mounted on the end of the output shaft 28 and a laminated iron field structure 56 mounted in the mouth of the cup-shaped support 55. The field structure 56 is an annular structure having four equally spaced inwardly directed poles 57 upon which are mounted bobbins 58 for receiving electrical windings of the generator. The armature 54, which like the field structure 56 is made of laminated iron, has the outline form of a pair of oppositely directed quadrants of a circle which quadrants are connected by a waist portion of sufficient width to accommodate a mounting fixture 59 securing the armature to the pointer shaft 16.

In Figure V the armature 54 is shown displaced 45° from its normal position. In its normal position each of the arcuate end portions of the armature 54 normally extends between a pair of poles 57 of the field structure 56 and overlaps half of the pole face of each of the poles so that the output signal is produced by the unbalance between the flux in the pairs of poles 57 as the armature 54 is rotated away from its normal position.

The wiring of the signal generator and the co-operation of the elements serving to control the motor 26 is illustrated in Figure VII. Briefly, the signal generator is energized with alternating current and an output signal varying according to the position of the armature 54 is derived. After amplification and modification the output signal is applied to one phase of the two-phase driving motor 26 which accordingly develops torque tending to align the stator 53 with the armature 54. The modification of the signal, which in effect is the addition of an anticipatory component, minimizes overrun of the motor 26. In the circuit shown, electrical current from an alternating current source of power is supplied through leads 60 and 61 to an amplifier 62 and through branch leads 63 and 64 to a first phase winding 65 of the motor 26. The field structure 56 is energized by alternating current flowing at reduced voltage from the amplifier 62 through a lead 66, a resistor 67, energizing coils 68, 69, 70 and 71 wound on the bobbins 58 of the field structure 56, and thence through a return lead 72 to the amplifier 62.

To secure the 90° phase shift required between the voltages applied to the fields of the motor 26 the impedance of the energizing coils 68, 69, 70 and 71 is made small compared to the resistance of the resistor 67 so that the current flowing in this circuit and the flux in the field structure 56 is nearly in phase with the power line voltage impressed across the motor winding 65.

The energizing coils 68 and 69 are connected so that at a given point in the alternating current cycle the flux in the corresponding poles 57 is directed outwardly toward the annular portion of the field structure 56 while the flux produced by the coils 70 and 71 is directed from the annular portion of the field structure 56 toward the inner end of the poles 57. The total energizing flux may be considered as divided between two parallel paths each of which includes the armature 54 and two of the poles 57 of the stator. The first of the two parallel magnetic paths is through the pole carrying the energizing coil 68, through the stator frame 56, the pole carrying the energizing coil 70, across the air gap into the adjacent surface of the armature 54, through the armature 54 and across the air gap into the pole carrying the coil 68, thus closing the magnetic path. The other path threads the pole through the energizing coil 71, across the air gap into the armature 54, through the armature, across the air gap into the pole carrying the coil 69, and through the stator ring 56 to the pole carrying the coil 71. By making the armature and stator of high permeability alloy the flux through each path is determined largely by the reluctance of the air gaps. By construction, the lengths of the air gaps are kept constant, while the cross sectional area varies with the position of the armature. When the armature 54 is in the position shown in Figure VII, i. e. is positioned midway between the pairs of poles so that each arcuate end overlaps half of each of the adjacent poles, the flux is equally divided between the two parallel paths. Any rotation of the armature 54 from this position disturbs this equality of flux division so that more of the flux passes through one set of oppositely located poles and less through the other set.

Pickup coils 73, 74, 75 and 76, also wound on the bobbins 58, are connected in series and connected through leads 77 and 78 to an input stage 79 of the amplifier 62. To detect the change of flux with armature position the pickup coils 73 and 75 carried on the poles included in the first magnetic path are connected in opposition to the pick-up coils 74 and 76. As long as the rotor 54 evenly divides the flux between the two parallel paths the voltage generated in the pickup coils 73 and 75 exactly balances or cancels the voltage generated in the pickup coils 74 and 76 and there is no net voltage appearing across the leads 77 and 78 leading to the input stage 79 of the amplifier 62. If the rotor is angularly displaced, the flux is no longer equally divided between the parallel paths and the voltage generated in the pickup coils linking one path exceeds that of the coils linking the other. The amplitude of the difference voltage is generally proportional to the relative angular misalignment between the armature 54 and the field structure 56 and the phase of the difference voltage is positive or negative depending upon the direction of the misalignment.

It was mentioned that the current flowing in the energizing coils 68, 69, 70 and 71 and the flux in the field structure 56 because of the effect of the resistor 67 is nearly in phase with the line voltage impressed on the leads 60 and 61. Since the voltage induced in the pickup coils 73, 74, 75 and 76 is proportional to the rate of change of flux through these coils the signal voltage appearing across the leads 77 and 78 is 90° out of phase with the line voltage. The signal voltage from the pickup coils after amplification and modification appears on output leads 80 and 81 of the amplifier 62 of which the lead 80 is connected directly to a second phase winding 82 of the motor 26 while the other output lead 81 is connected through normally closed contacts 83 of a relay 84 to the other end of the second phase winding 82.

The power leads 60 and 61 are normally supplied with alternating current at commercial power frequency, usually sixty cycles per second, and the amplifier 62 is designed to have little or no phase shift at this frequency. The 90° phase relation between the current flowing in the field windings 65 and 82 of the motor 26 as is required to provide a rotating field is provided by the 90° phase difference between the current flowing in the energizing coils 68, 69, 70 and 71 and the voltage generated in the pickup coils. Obtaining the 90° phase shift for the motor 26 in this manner eliminates the condenser that is usually connected in series with one or the other of the motor windings.

Since the amplifier 62 including its input stage 79 is essentially a linear device, the current flowing in the second phase winding 82 is proportional to the signal voltage induced in the pickup coils 73, 74, 75 and 76 which voltage is substantially proportional to the rotational displacement of the armature 54 from its neutral position. Furthermore, the torque developed by the motor 26, at least at low speeds, is directly proportional to the current flowing in the second phase winding 82. The armature of the motor 26 is connected through the gear train 27 to the stator 53 which includes a field structure 56. The net effect of these relationships is that angular misalignment of the armature 54 and field structure 56 causes the motor to develop a torque proportional to the misalignment and in a direction tending to reduce the misalignment.

The combination of the signal generator, amplifier, and motor is the same in general effect as a spring acting between the armature 54 and the stator 53 to resist relative angular rotation of the armature and the stator except that no reaction force is exerted against the armature. Like a spring, the resisting torque of the system is proportional to displacement both in direction and in amount and, like a spring, combines with the inertia of the armature of the motor 26, the stator 53 and any connected mass to form a system capable of oscillation. One essential difference between this electrical system and an oscillatory system comprising a mass and a spring is that an external source of power is employed with the amplifier and it is possible for energy to be fed into the system to sustain oscillation while the ordinary mass and spring combination has no external source of power and consequently its vibrations, while they may persist for a time, eventually die out.

To be commercially acceptable, however, it is not sufficient that the oscillations of the motor 26 and stator 53 eventually die out but, further, it is required that the oscillatory motion following any disturbance of the system shall vanish within one or two cycles of the oscillation. In the case of a mass and a spring, the oscillations following a disturbance may be suppressed by imposing a frictional load or damping on the system so that the forces acting on the mass consist of a spring force urging the mass toward its neutral position and a retarding force proportional to the velocity of the mass opposing the motion of the mass. In the motor control system the signal from the signal generator, which is proportional to the displacement of the field structure 56 from the armature 54, is modified so that the output of the amplifier 62 includes not only the original component but also a secondary component that is roughly proportional to the relative velocity between the armature 54 and the field structure 56 and which, acting through the motor 26, generates a quasifrictional torque between the armature 54 and field 56 serving to suppress any tendency of the motor 26 to drive the field structure 56 back and forth on either side of its neutral position with respect to the armature 54 in an oscillatory manner.

The secondary component to provide the quasifrictional torque or damping is generated in an electrical network connected between the input stage 79 and the remainder of the amplifier 62. This electrical network comprises a resistor 85, a condenser 86, a resistor 87, and an inductance coil 88 connected in series across the output of the input stage 79 of the amplifier. The junction between the first resistor 85 and the condenser 86 is also connected through a condenser 89 and a potentiometer 90, serving as an amplification control, to the next stage of the amplifier 62. The amplified signal voltage impressed across the series circuit is always of the same frequency as the frequency of the power line although the amplitude of the signal voltage and its phase with respect to the power line change according to the relative position of the armature 54 and the field structure 56 of the signal generator. The condenser 86 and the inductance coil 88 are selected so that their reactive impedances exactly cancel each other at the power line frequency, i. e. the circuit is tuned to the power frequency. Therefore, as long as the amplitude of the signal voltage at the output of the amplifier stage 79 is constant, the voltage drop across the condenser 86 exactly balances the voltage drop of the inductance coil 88. Under this condition the resistors 85 and 87 determine the current flow through the series circuit and, acting as a voltage divider, apply a voltage across the potentiometer 90 equal to the voltage developed across the resistor 87.

With constant signal amplitude, electrical energy of constant amount is stored in the tuned combination of the condenser 86 and inductance coil 88, the energy flowing from one to the other in the same manner as the energy stored in an oscillating mass and spring combination continually changes from kinetic energy in the moving mass to potential energy in the extended spring and back again as the mass oscillates. As the amplitude of the signal voltage changes with relative movement between the armature 54 and the field structure 56 a portion of the signal voltage is utilized in changing the energy content of the tuned combination of the condenser 86 and the inductance coil 88. This component of voltage, which is approximately proportional to the velocity of the relative movement of the armature 54 with respect to the field structure 56, is added to the voltage appearing across the series resistor 87 and together with that voltage is applied to the remainder of the amplifier 62.

The time constant of the series circuit, which constant is dependent upon the relative magnitudes of the impedances of the condenser 86 and inductance coil 88 with respect to the resistance of the resistor 87, is selected so that the added or secondary component of voltage is of sufficient duration and magnitude to overcome the inertia of the motor armature and thus to cause the motor to drive the field structure 56 into rotational agreement with the armature 54 with a minimum of overshooting of the desired alignment or synchronism between the armature and the field structure.

The series circuit including the resistors 85, 87, the condenser 86, and inductance coil 88 is, in some respects, analogous to a mechanical system comprising a flywheel that is driven by a hydraulic clutch and which flywheel is connected to a viscous friction load. As long as the speed of the hydraulic clutch is constant all of the force transmitted to the flywheel is used in overcoming the viscous friction load. If the speed of the hydraulic clutch is varying, a portion of the force applied to the flywheel is employed to overcome the inertia of the flywheel to change its speed. In the comparison of these systems the resistor 85 corresponds to the hydraulic clutch, the resistor 87 corresponds to the friction or viscous load applied to the flywheel and the combination of the condenser 86 and the inductance coil 88 corresponds to the flywheel itself. The voltage applied to the circuit corresponds to the force applied to the hydraulic clutch while the voltage appearing across the condenser 86, resistor 87, and inductance coil 88 corresponds to the force applied to the flywheel. The electrical energy oscillating between the condenser 86 and inductance coil 88 at power line frequency corresponds to the kinetic energy stored in the flywheel. In the case of the flywheel, the force applied to it consists of a first component that is proportional to its speed and which is used to overcome the friction load and a second component that is proportional to its rate of change in speed. Likewise the voltage applied to the series circuit of the condenser 86, resistor 87, and inductance coil 88, for a given alternating current flowing through the resistor 85, includes a first component that overcomes the resistance of the resistor and a second component that overcomes the "inertia" of the condenser 86 and inductance coil 88. The term "inertia" as applied in the previous sentence denotes the tendency of the circuit to maintain a constant storage of energy and oppose any change in the quantity of stored energy.

From this mechanical analogy it is easily seen that the signal voltage applied to the amplifier 62 consists of a first component that is proportional to the signal received from the signal generator and a second component that is proportional to the rate of change of that signal with respect to time, which rate of change is sometimes called the time derivative of the amplitude of the signal voltage.

The operation of the series circuit from the quantitative standpoint may be calculated according to carrier-current theory. In applying this theory, the voltage from the power line is the carrier voltage and the output of the signal generator consists of this carrier voltage modulated according to the position of the armature 54 with respect to the field structure. The resulting modulation is of the type commonly referred to as suppressed carrier modulation. In applying carrier-current theory, the combination of the condenser 86 and inductance coil 88, which combination is tuned to the carrier frequency, is replaced by an inductance of approximately twice the impedance of the inductance 88 and the response of the circuit to the modulating frequency, i. e. the signal resulting from the relative motion of the armature 54 and the field structure 56, is calculated.

The action of the series circuit may be visualized by a method somewhat similar to the carrier-current analysis just mentioned. In visualizing the operation of the circuit the signal voltage of the signal generator is considered as composed of the sum of two alternating voltages of constant equal amplitude that shift phase with respect to each other and with respect to the power line so that their sum is at all times equal to signal voltage as determined by the position of the armature 54 in the field structure 56. These voltages of constant amplitude, when the armature is displaced in one direction, are in phase with each other and lead the voltage on the power line by substantially 90°. As the armature is moved toward its neutral position, where the flux in the poles is balanced, the voltages of constant amplitude shift phase with respect to each other, one advancing and one retarding, until at the neutral position the voltages are 180° out of phase with each other and there is no net voltage. As the armature 54 goes beyond the neutral position and approaches its maximum displacement in the other direction the constant voltages shift phase still further until finally they are again in phase with each other but are now lagging the power line voltage by substantially 90°. The phase shift between these two constant alternating voltages thus determines the amplitude of the signal applied to the amplifier 62 but does not affect the frequency of the alternating voltage because the only effect is a shift of the phase of one of the constant voltages with respect to the other.

During the time that the armature is moving from one position to another the phase of one of the constant voltages is advancing and the phase of the other is retarding, the rates of advance and retardation being equal and being determined by the rate of movement or speed of the armature with respect to the stator. During this interval the instantaneous frequency of the advancing component is greater than and the instantaneous frequency of the retarding component is less than the power line frequency, it being remembered that the rate of change of phase is at all times such as to maintain the sum of the two constant voltages equal to the signal voltage generated within the generating unit.

The series circuit including the condenser 86 and inductance coil 88 presents an inductive reactance to the component of voltage having the higher instantaneous frequency and a capacitive reactance to the component of voltage having the lower frequency. The voltage across an inductive reactance has a phase angle that leads the phase of the current flowing through the reactance while the voltage across a capacitive reactance has a phase angle that lags the current flowing through the reactance. The two equal voltages produce corresponding currents flowing through the series circuit which, because of the current limiting effect of the resistor 85, are in phase with each of the two equal components of voltage making up the signal voltage. The current having the higher instantaneous frequency meeting the inductive reactance of the series circuit produces the component of voltage the phase of which is advanced still further while the current component having the lower instantaneous frequency meets a capacitive reactance thus producing a component of voltage the phase of which is retarded still further than the corresponding component of voltage from the signal generator. As a result of these phase shifts impressed on the components of the signal voltage by the series circuit the sum of the two output voltages increases faster than the signal voltage itself when the signal voltage is increasing and decreases faster when it is decreasing so that as the armature approaches neutral position the sum of the output voltages appearing across the reactive portion of the series circuit actually reach zero before the armature 54 reaches its neutral position. This gives the effect of a leading signal that, in effect, anticipates changes in rotational alignment between the armature 54 and field 56 and supplies a quasifrictional torque to the motor tending to oppose changes in alignment and to bring it to the correct speed as the field structure 56 is driven into positional agreement with the armature 54. This quasifrictional torque developed electrically by the series resonant circuit is superior to a viscous load applied to the motor 26 because it allows precise positional alignment of the signal generator elements when the load on the scale is changing at a constant rate as well as when the load is constant and the scale is at rest.

The armature 54, except for the limitations of auxiliary equipment, is capable of continued rotation with respect to the field structure 56 of the signal generating means. The armature 54 merely serves to distribute the energizing flux between the respective poles of the field structure 56 and the output signal is determined only by the distribution of the flux. As a result, there are four positions of the armature with respect to the field at which the flux is equally divided between the pairs of poles so that no output voltage is generated. Of these positions, one corresponds to the position of the armature 54 as shown in Figure VII and one to the position when the armature is turned one-half revolution from the illustrated position. A small departure from either of these positions results in a motor torque tending to drive the field structure 56 in a direction to cancel the departure. The other two positions at which no signal voltage is generated are reached when the armature 54 is rotated 90° in either direction from the position shown. Any small departure from these latter positions causes a motor torque to be developed in a direction tending to increase the departure. The system thus exhibits two stable positions and two unstable zero signal positions for one revolution of the armature 54 with respect to the field 56.

Since the motor attempts to synchronize on the nearest of the two stable positions, it will synchronize correctly only if the misalignment of the armature 54 and the field 56 is less than 90°. However, the pointer shaft 16 carrying the armature 54 is capable of slightly more than one revolution with respect to the output shaft 28 carrying the field 56. Auxiliary mechanism is, therefore, provided to insure that the output shaft 28 is always aligned with the pointer shaft 16 and not left 180° out of alignment. The auxiliary mechanism consists of a brush 91 mounted on the pointer shaft 16 to complete a circuit between a pair of interrupted slip rings 92 mounted on an insulating ring 93 of the cup-shaped stator support 55 whenever substantial misalignment between the armature 54 and field structure 56 occurs. When the brush 91 interconnects the slip rings 92 current flows from the amplifier 62 through the coil of the relay 84, through a lead 94 connected to one of the slip rings 92, through the brush 91 to the other of the slip rings 92 and to a return lead 95 connected to the amplifier 62. Current flow through this circuit causes the relay 84 to open its normally closed contacts 83 and thus disconnect the second phase winding 82 of the motor 26 from the amplifier. In normal operation the brush 91 and slip rings 92 come into engagement only when load is applied to the weighing mechanism so rapidly that the motor 26 is unable to maintain the field structure 56 in alignment with the armature 54. Even under this rapid change in load the motor starts to follow and is rotating before the relay 84 is energized.

It is a characteristic of an induction motor that it will operate on a single winding once it is started. The direction of rotation is indeterminate because once started it continues to run in the same direction under the influence of a rotating magnetic field produced by the interaction of the rotating armature and the field of the motor. The motor 26 continues to operate single phase, i. e. with the second phase winding 82 disconnected, until the field structure 56 carrying the slip rings 92 catches up with the armature 54 at which time the ends of the brush 91 leave the slip rings 92 to enter cutout portions 96 and 97 and the relay 84 recloses its contacts 83 to restore the system to normal operation. If, as a result of some disturbance, the motor 26 is running in the wrong direction when the relay 84 is energized it runs until the output gear 44 carrying the pin 45 is stopped by the resilient stops 48. This stops the motor but the resiliency of the stops gives the motor a start in the opposite direction so that instead of remaining stationary at the end of its travel it reverses and drives the stator 53 back the other way until it finds its position of synchronism with the armature 54.

The cutout portions 96 and 97 eliminate any frictional connection between the pointer shaft 16 and the output shaft 28 so that there is no reaction from the mechanism carried on the output shaft 28 reflected back into the load indication as determined by the position of the pointer shaft 16. There is practically no magnetic torque reaction between the armature 54 and the field structure 56 because throughout the normal operating displacements the total flux remains constant and the pull of one of the poles 57 on the armature 54 is balanced by the pull of the next adjacent pole 57. The pulls exactly balance except for the effect of fringing flux that disturbs the constancy of the air gap area with movement of the armature in the field structure. Except for the fringing flux the sum of the effective areas of the pole faces of the poles 57 that are covered by the armature 54 and the total flux, which is determined principally by the reluctance of the air gaps between the armature and the field structure, remains constant through all positions of the armature. Therefore, the energy content of the magnetic field is also constant. As long as there is no change in energy content there is no force tending to move one of the parts of the magnetic circuit with respect to another part and therefore no torque reaction between the field structure and the armature 54.

The electrical leads connected to the slip rings 92, the energizing coils, and the pickup coils are carried through a cable 98 which in Figure III is shown rigidly connected to the stator member 53, and loosely wrapped around the bracket 44 carrying the output shaft 28. Its other end is rigidly connected to the back plate 31 of the frame. As the output shaft 28 turns the cable 98 winds or unwinds as necessary to accommodate the rotation.

The circuit of the amplifier 62 including the input stage 79 (shown schematically in Figure VIII) consists of three stages of voltage amplification, a phase inverter stage and a push-pull power amplifier that is transformer coupled to the second phase winding 82 of the motor 26. Signal voltages from the pickup coils 73, 74, 75 and 76 are transmitted through the leads 77 and 78 connected to the input of the amplifier. The lead 78 is grounded while the lead 77 is connected through a resistor 99 to a grid 100 of a first section of a dual triode vacuum tube 101. A resistor 102 connected between the leads 77 and 78 serves as a grid return for the said 100 in the event that the pickup coils become open circuited.

The grid 100 cooperates with a cathode 103 and a plate 104 to control the flow of current through a plate resistor 105 and a cathode resistor 106. The plate resistor 105 is connected to a lead 107 which is supplied with regulated direct current voltage of a suitable potential. The junction between the plate 104 and the plate resistor 105 serves as the output of the input stage 79 of the amplifier and is connected to the resistor 85 feeding the series resonant circuit including the condenser 86, resistor 87 and inductance coil 88.

The voltage across the series resonant circuit is transmitted through the condenser 89 to the potentiometer 90 which serves as the gain control of the amplifier. The slidable connection of the potentiometer 90 is connected to a grid 108 of the second section of the dual triode vacuum tube 101 which grid 108, in cooperation with a cathode 109 and a plate 110 of the second section of the vacuum tube 101, controls the current flow through a plate resistor 111 and a cathode resistor 112. Grid bias voltages for the sections of the dual triode tube 101 are provided by the voltage drop across the cathode resistors 106 and 112. The voltage appearing at the plate 110, which is an amplified replica of the voltage applied to the grid 108, is transmitted through a coupling condenser 113 to a resistance network 114 leading to a grid 115 of a second vacuum tube 116.

The resistance network 114 includes a first resistor 117 connected between the coupling condenser 113 and the grid 115 of the second amplifier tube 116. The junction between the coupling condenser 113 and the resistor 117 is connected to ground through a series combination of a resistor 118 and a condenser 119. Furthermore, the condenser 119 is paralleled by a resistor 120 connected to the slidable connection of a potentiometer 121 the ends of which are connected across a filament winding 122 of a power transformer 123. The center tap of the filament winding 122 is grounded so that by moving the slidable connection of the potentiometer 121 from one end to the other of the voltage impressed on the resistor 120 may be varied from a positive voltage equal to half the filament voltage to a negative voltage of the same amount. The resistor 120 and the condenser 119 are selected so that the current flow through the resistor 120 and condenser 119 produces a voltage drop across the condenser 119 that is substantially 90° out of phase with the voltage appearing across the terminals of the filament winding 122. The voltage across the condenser 119, which is added to the signal voltage, is thus either in phase or 180° out of phase with the signal voltage and may be adjusted to either add or to subtract from the signal voltage.

The first section of the vacuum tube 116, which includes the grid 115, is connected in series with a plate resistor 124 and a cathode resistor 125, that are connected to a plate 126 and cathode 127 respectively, between the regulated voltage supply lead 107 and ground.

The amplified voltage appearing at the plate 126 is transmitted through a resistor 128 to a grid 129 of the second half of the vacuum tube 116. The resistor 128 serves to limit the grid current to the grid 129 under certain conditions of operation. The second half of the vacuum tube 116 is employed as a phase inverter and to this end its plate 130 is connected to the regulated voltage lead 107 through a resistor 131 while its cathode 132 is connected through a resistor 133 to ground. The resistances of the resistors 131 and 133 are equal with the result that the signal voltage applied to the grid 129 is reproduced without change of phase and at substantially the same amplitude at the cathode 132 while a voltage of the same amplitude but reversed in phase appears at the plate 130. This half of the tube 116 thus converts the amplified signal of the preceding amplifier stages into a push-pull signal suitable for amplification in a push-pull amplifier.

The plate 130 of the phase inverter is connected through a condenser 134 to a control grid 135 of a first power amplifier tube 136 while the cathode 132 of the phase inverter is connected through a condenser 137 to a control grid 138 of a second power amplifier tube 139. Cathodes 140 and 141 of the power amplifier tubes 136 and 139 are connected together and through a cathode resistor 142 to ground. The grids 135 and 138 are returned to ground through grid resistors 143 and 144 respectively. Plates 145 and 146 of the power amplifier tubes 136 and 139 are connected to the ends of a primary winding 147 of a power output transformer 148 having a center tap 149 connected through a lead 150 to a source of high voltage direct current. Screen grids 151 and 152 of the power amplifier tubes 136 and 139 are connected together and to the lead 150.

A secondary winding 153 of the output transformer 148 is connected directly to the leads 80 and 81 leading to the second phase winding 82 of the motor 26.

The phase shift of the power amplifier section of the amplifier is reduced by negative feedback. The feed-back path extends from one side of the secondary winding 153 of the output transformer 148 through a lead 154, voltage dividing resistors 155 and 156, one of which is connected to ground, and a resistor 157 connected to the grid 115 of the first section of the amplifier tube 116. In this feed-back circuit the phase relations are such that the voltage impressed on the grid 115 tends to oppose the signal voltage transmitted from the first amplifier tube through the coupling condenser 113 and resistor 117.

The amplifier, exclusive of the series resonant circuit, is designed primarily for operation at sixty cycles per second—the power line frequency —and the phase shift between the input and output is kept to a minimum. Likewise, since the secondary of the output transformer 148 is operating into an inductive load—the field 82 of the motor 26—it is advantageous to connect a condenser 158 across either the primary or the secondary winding of the transformer 148 to correct the power factor of the load presented to the power amplifier tubes 136 and 139.

Direct current for operating the amplifier is obtained from the alternating current supply leads 60 and 61 through a power supply section including the transformer 123 which has a primary winding 159 connected to the leads 60 and 61. In addition to the filament winding 122, the transformer 123 includes a rectifier filament winding 160 and a high voltage winding 161. The rectifier filament winding 160 is connected to a filament 162 of a rectifier tube 163 having plates 164 and 165 connected to the ends of the high voltage winding 161. A grounded center tap 166 of the high voltage winding 161 provides the negative current return from the amplifier.

The filament 162 of the rectifier tube 163 constitutes the positive terminal of the power supply and is connected through a smoothing filter including a choke coil 167 and a filter condenser 168 to one end of the lead 150, which in the drawings is broken with the broken ends indicated by the letter Y. To supply power to the regulated voltage lead 107 the lead 150 is connected to ground through a series combination of resistors 169, 170 and voltage regulator tube 171 with the lead 107 connected to the positive terminal of the regulator tube 171. The junction between the resistors 169 and 170 is connected through a filter condenser 172 to ground. In this circuit the resistor 169 serves to limit the current flow while the resistor 170 is included to protect the voltage regulator tube 171 from excessive current in the event that it is inserted into its socket after the circuit is in operation and the condenser 172 is charged to the same voltage as that appearing on the lead 150.

The circuit for energizing the relay 84 is fed from the high voltage lead 150 through a current limiting resistor 173. The relay coil 84, as was mentioned previously, controls its contacts 83 to disconnect the second phase winding 82 of the motor when excessive misalignment occurs within the signal generator.

It is to be understood that the voltage amplifier tubes 101 and 116 and the power amplifier tubes 136 and 139 have electrically heated filaments which are not shown in the drawings but which are connected to the terminals $x, x$ of the filament winding 122.

This relatively simple amplifier and signal generator provides an economical, operationally satisfactory apparatus for maintaining a torque consuming indicating mechanism in accurate positional agreement with a movable portion of a load counterbalancing mechanism without imposing any force on the load counterbalancing mechanism which would interfere with an accurate indication of the load. By selecting a motor having a high ratio of torque to armature moment of inertia and selecting constants for the series resonant circuit to correspond, it is possible to construct a system that will drive the indicating mechanism to its load indicating position in substantially the same length of time as is required for the load counterbalancing mechanism to come to rest following a change in load or other disturbance. The incidental features include a mechanism for insuring accurate synchronization at only one of the two possible synchronizing positions as well as insuring sufficient braking torque to prevent the motor from driving the indicating mechanism beyond the true load indicating position. These features make it possible to operate various types of indicating mechanism and industrial controls according to a load on a weighing scale with an accuracy heretofore unknown.

Various modifications may be made in the component elements and in the driving mechanism between the motor and the signal generator or between the motor and the indicating mechanism without departing from the spirit and scope of the invention.

Having described the invention, I claim:

1. In a device of the class described, in combination, a movable condition responsive member, a second member that is movable along a path parallel to the path of movement of the condition responsive member, a two-phase motor having a first phase connected to a source of power for driving the second member, means mounted on said members for generating an electrical signal that for a limited amount of relative displacement of the members varies according to such displacement, an amplifier connected between the signal generating means and a second phase of the motor to cause the motor to drive the second member to reduce the displacement between the members, cooperating contact elements carried on said members, means controlled by said contact elements for disconnecting the motor from the amplifier when the relative displacement of the members exceeds a predetermined amount, and resilient stops for limiting the range of travel of the second member and, when the motor is disconnected from the amplifier, for reversing said motor as the second member reaches either end of its travel.

2. In a device of the class described, in combination, a movable condition responsive member, a second member that is movable along a path parallel to the path of movement of the condition responsive member, a two phase motor having a first phase connected to a source of power for driving the second member, an armature mounted on the condition responsive member, a field structure mounted on the second member, an amplifier connected between the field structure and the motor, said armature and field structure cooperating for a limited relative displacement of the members to give a signal that varies according to such displacement and that causes the motor to reduce the displacement, a pair of interrupted slip rings on said field structure, a brush on the condition responsive member for connecting the slip rings when the relative displacement of the members exceeds a predetermined amount, means controlled through the slip rings for de-energizing the motor phase connected to the amplifier to permit the motor to run on the first phase when the relative displacement of the members is large, and resilient stops for reversing the motor at each end of its range of travel.

3. In a weighing scale indicating system, in combination, an automatic load counterbalancing mechanism, a first member driven by said mechanism to a position indicative of the load being counterbalanced, a second member that is movable along the path of the first member, means mounted on the second member for generating an electrical signal which for small displacements of the members is proportional to the displacement between the members, an amplifier connected to said means for amplifying the electrical signal, means included in the amplifier for advancing the phase of the amplifier output with respect to the displacement signal, and a motor controlled by the amplifier output and mechanically connected to said second member for driving the second member into registry with the first member.

4. In a weighing scale indicating system, in combination, an automatic load counterbalancing mechanism, an indicator shaft driven by said mechanism, a two pole armature mounted on the indicator shaft with the poles diametrically opposite each other, a second shaft in axial alignment with the indicator shaft, a four pole field structure mounted on the second shaft with its field poles cooperating in pairs with the poles of the armature, a first set of windings on the field poles for inducing magnetic flux in the field poles and armature, a second set of windings on the field poles which windings are energized by unbalance in the flux distribution between the field poles resulting from movement of the armature, an amplifier for amplifying the voltage generated in the second set of windings, a motor that is controlled by the amplifier, and gearing connecting the motor to the second shaft, said motor and amplifier being connected so that the motor drives the second shaft in a direction to reduce the flux unbalance and thus maintain the output shaft in positional agreement with the indicator shaft.

5. In a weighing scale indicating system employing a motor to drive an output shaft into positional agreement with an indicator shaft, in combination, an armature mounted on the indicator shaft, said armature having a pair of diametrically positioned symmetrically shaped poles, a field structure mounted on the output shaft, said field structure having a pair of poles for each pole of the armature with the poles of the pair spaced so that approximately half the area of each pole is juxtaposed to the armature pole cooperating with that pair of poles, a first set of windings on the field poles for inducing a magnetic field threading the armature and the pairs of field poles cooperating therewith, a second set of windings on the field poles connected to generate a voltage depending upon the relative position of the armature in the field structure, and an amplifier connected to the second set of windings, the amplifier serving to control the motor that drives the output shaft.

6. In a weighing scale indicating system, in combination, an indicator shaft that is rotated by load counterbalancing mechanism, a two pole armature mounted on the indicator shaft, an output shaft, a four pole field structure mounted on the output shaft in position to cooperate with the armature, windings on the poles for energizing the field structure and the armature, said poles and armature being arranged so that the total flux in the field structure does not vary with small movements of the armature with respect to the field structure, voltage windings on the field poles arranged to deliver an output voltage that varies with the position of the armature with respect to the field structure, a high impedance input amplifier connected to the voltage windings, a motor controlled by the amplifier, and gearing connecting the motor to the output shaft, said amplifier and motor being arranged to drive the output shaft in a direction tending to reduce the output voltage of the voltage winding.

WILLIAM M. PEASE.

REFERENCES CITED

The following references are of record in the file of this patent:

UNITED STATES PATENTS

| Number | Name | Date |
|---|---|---|
| 511,560 | Tesla | Dec. 26, 1893 |
| 1,024,635 | Kunkel | Apr. 30, 1912 |
| 1,959,804 | Wittkuhns et al. | May 22, 1934 |
| 1,988,458 | Minorsky | Jan. 22, 1935 |
| 2,184,576 | Beyerle | Dec. 26, 1939 |
| 2,346,117 | Stabler | Apr. 4, 1944 |
| 2,439,198 | Bedford | Apr. 6, 1948 |
| 2,445,773 | Frost | July 27, 1948 |
| 2,446,567 | White et al. | Aug. 10, 1948 |

OTHER REFERENCES

"Servomechanism Fundamentals," by Lauer, Lesnick, and Matson, McGraw-Hill Book Company, Inc., copyright 1947, pp. 157–158.